United States Patent
Shin

(10) Patent No.: US 9,016,310 B2
(45) Date of Patent: Apr. 28, 2015

(54) AUTOMATIC WATER SHUT-OFF VALVE FOR LOW PRESSURE

(71) Applicant: Hong Kun Shin, Gyeongsangnam-Do (KR)

(72) Inventor: Hong Kun Shin, Gyeongsangnam-Do (KR)

( * ) Notice: Subject to any disclaimer, the term of this patent is extended or adjusted under 35 U.S.C. 154(b) by 198 days.

(21) Appl. No.: 13/741,460

(22) Filed: Jan. 15, 2013

(65) Prior Publication Data

US 2013/0126020 A1     May 23, 2013

Related U.S. Application Data

(63) Continuation of application No. PCT/KR2011/004712, filed on Jun. 28, 2011.

(30) Foreign Application Priority Data

Jul. 20, 2010 (KR) ........................ 10-2010-0070214

(51) Int. Cl.
*F16K 7/00* (2006.01)
*F16K 24/04* (2006.01)
*F16K 15/14* (2006.01)

(52) U.S. Cl.
CPC . *F16K 7/00* (2013.01); *F16K 24/04* (2013.01); *F16K 15/144* (2013.01)

(58) Field of Classification Search
CPC ... F16K 15/023; F16K 15/144; F16K 15/147; F16K 17/28
USPC ......... 137/497, 498, 517, 859, 601.2, 505.13, 137/503, 504
See application file for complete search history.

(56) References Cited

U.S. PATENT DOCUMENTS

| | | | | |
|---|---|---|---|---|
| 2,497,906 A | * | 2/1950 | Peters et al. | 137/496 |
| 2,615,675 A | * | 10/1952 | Mellert | 137/498 |
| 2,674,262 A | * | 4/1954 | Bradshaw | 137/517 |
| 3,351,088 A | * | 11/1967 | Jensen | 137/517 |
| 3,807,430 A | * | 4/1974 | Keller | 137/504 |
| 3,973,410 A | * | 8/1976 | Putman et al. | 62/527 |
| 4,022,244 A | * | 5/1977 | Oman | 137/517 |
| 4,938,259 A | * | 7/1990 | Schmidt | 138/45 |
| 5,988,211 A | * | 11/1999 | Cornell | 137/504 |

FOREIGN PATENT DOCUMENTS

| | | |
|---|---|---|
| JP | 5-75578 U | 10/1993 |
| JP | 7-18504 B2 | 3/1995 |
| KR | 20-0155921 Y1 | 6/1999 |

OTHER PUBLICATIONS

International Search Report (PCT/KR2011/004712), WIPO, Dec. 16, 2011.

* cited by examiner

*Primary Examiner* — Kevin Murphy
*Assistant Examiner* — R. K. Arundale
(74) *Attorney, Agent, or Firm* — Park & Associates IP Law, P.C.

(57) ABSTRACT

An automatic water shut-off valve for low pressure includes: a body having a nipple formed at a lower portion thereof; a rubber diaphragm inserted into a protruding threaded pipe formed at an outside portion of the body; and a pressure supporter pressurizing the rubber diaphragm, wherein the pressure supporter has a drain hole and the fixing cap has a cap drain hole, so that the fluid is drained through a fluid flow hole of the rubber diaphragm in the case of compressible air fluid or at pressure lower than set pressure and is stopped when the fluid switching face of the rubber diaphragm is grounded to a fluid stop protrusion of the pressure supporter in the case of incompressible fluid or at pressure higher than set pressure.

5 Claims, 4 Drawing Sheets

AUTOMATIC WATER SHUT-OFF VALVE FOR LOW PRESSURE

REFERENCE TO RELATED APPLICATIONS

This is a continuation of pending International Patent Application PCT/KR2011/004712 filed on Jun. 28, 2011, which designates the United States and claims priority of Korean Patent Application No. 10-2010-0070214 filed on Jul. 20, 2010, the entire contents of which are incorporated herein by reference.

FIELD OF THE INVENTION

The present invention relates to an automatic water shut-off valve for low pressure, which can be automatically opened and closed at low pressure, and more particularly, to an automatic water shut-off valve for low pressure, which is automatically opened in the case of compressible air fluid or at pressure lower than set pressure and automatically closed in the case of incompressible fluid or at pressure higher than set pressure.

BACKGROUND OF THE INVENTION

In drip tapes and inline drip irrigation systems used for green house cultivation or outdoor cultivation, it is common that agglutinates by supply of liquefied fertilizers, fur inside tubes, foreign matters, sands, and others stop holes of drip buttons and inline structures. Moreover, after irrigation is finished, there is a difference in height of water contained in the drip tape and the inline drip irrigation system. In this instance, a differential head is generated due to a difference of height of water, and hence, water flows down to a lower region. So, a vacuum state is formed in a drip button labyrinth and an inline structure labyrinth which are located at a higher region, and hence, outside dirty liquid or dust is sucked into a hole of the drip button labyrinth and a hole of the drip line labyrinth, such that the drip tape button hole and the inline drip labyrinth hole are stopped.

Furthermore, in the case of an irrigation system of a mini sprinkler, foreign matters introduced into a pipe stop a nozzle hole of the sprinkler, and hence, they prevent a uniform watering. In order to prevent the above problem, a valve is mounted at an end portion of the pipe, but it also has a problem in that the end portion of the pipe freezes and bursts due to water filling the pipe in winter season.

In order to solve the above problem, an automatic water shut-off valve is mounted at the end portion of the pipe, and the conventional automatic water shut-off valve is used by operating a rubber plate using a spring.

However, the conventional automatic water shut-off valve also has several problems in that it does not work properly due to scale and corrosion by foreign matters and in that it has a limit to vent out lots of fluid. Furthermore, automatic water shut-off valve has another problem in that it is difficult to manage physical properties due to elasticity of the spring.

As another example, FIGS. 1 and 2 illustrate an automatic water shut-off valve 100 for low pressure.

The automatic water shut-off valve 100 includes a main body 102, a fluid supply pipe 101 formed at a lower middle portion of the main body 102, a drain hole 103 formed outside the fluid supply pipe 101, a rubber diaphragm 104 adapted for covering the drain hole 103, and a cap 105 screw-coupled to the main body 102, an edge of the diaphragm 104 being fixed by a pressure fixture 106 pressurized by the cap 105.

The rubber diaphragm 104 includes a hole 104a formed in the middle and connected with the fluid supply pipe 101, a concentrically wave-formed uneven portion 104b, and a ground surface 104c formed around the hole 104a inside the uneven portion 104b in such a way as to get in contact with a ground protrusion 107 projecting from an inner face of the drain hole 103 of the main body 102. Moreover, the pressure fixture 106 includes an arc-shaped ground surface 106a formed on a portion that gets in contact with the rubber diaphragm 104.

The conventional automatic water shut-off valve 100 naturally drains a fluid, which is supplied through the fluid supply pipe 101, through the drain hole 103 in a state where the rubber diaphragm 104 is fixed, but introduces a pressure fluid toward the pressure fixture 106 through the middle hole 104a of the rubber diaphragm 104 connected with a front end of the fluid supply pipe 101 in series when pressure is applied. In this instance, while the wave-formed uneven portion 104b of the rubber diaphragm 104 is unbent as shown in FIG. 2, the ground surface 104c gets in contact with the ground protrusion 107 formed on the main body 102, so that it is prevented that the fluid is discharged out through the drain hole 103.

However, the conventional automatic water shut-off valve 100 has a problem in that foreign matters frequently stay in between the ground surface 104c and the ground protrusion 107, and hence, water leak frequently occurs even though pressure more than the set pressure is applied.

SUMMARY OF THE INVENTION

Accordingly, the present invention has been made in an effort to solve the above-mentioned problems occurring in the prior arts, and it is an object of the present invention to provide an automatic water shut-off valve for low pressure which is opened in the case of compressible air fluid or at pressure lower than set pressure and automatically closed in the case of incompressible fluid or at pressure higher than set pressure.

To achieve the above objects, the present invention provides an automatic water shut-off valve for low pressure, which a pressure supporter and a fixing cap fixing a rubber diaphragm respectively have drain holes located in a fluid flow direction, so that the rubber diaphragm is pressurized toward the pressure supporter to seal the drain holes in the case of compressible air fluid or at pressure lower than set pressure.

The automatic water shut-off valve according to the present invention is easily assembled and disassembled and is easy to clean and replace with a new one because it is simple in structure, and can easily control the fluid according to hardness of the rubber diaphragm.

Moreover, the automatic water shut-off valve according to the present invention extends the lifespan because plastic additives and materials having characteristics of good corrosion resistance, water resistance, and light stability are used.

DETAILED DESCRIPTION OF THE INVENTION

Figure 1:
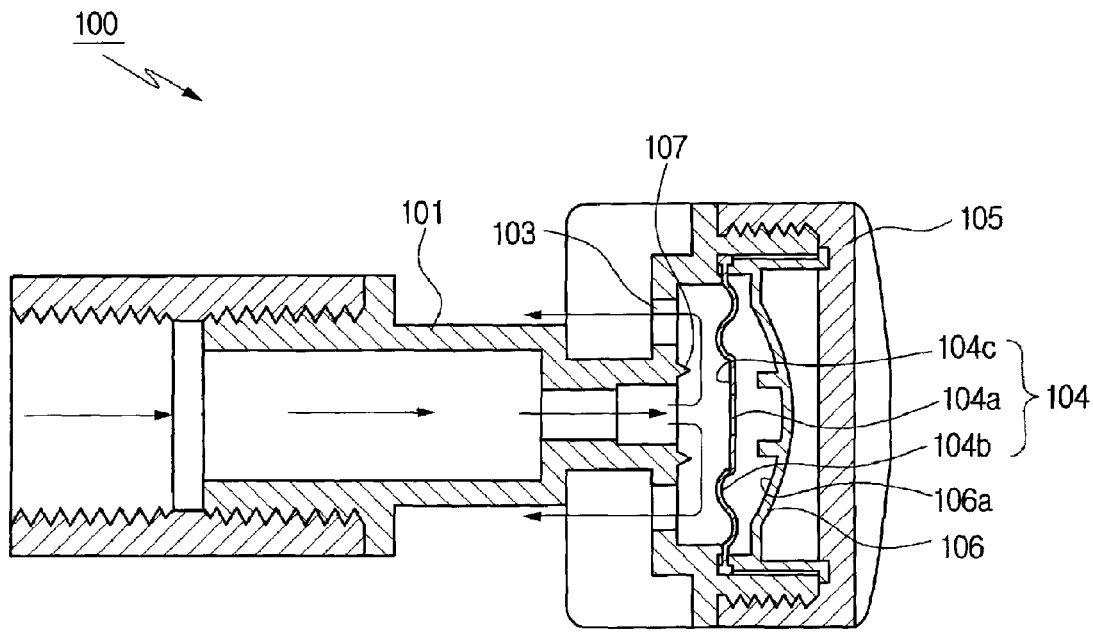
FIGS. 1 and 2 are sectional views of an automatic water shut-off valve according to a prior art, showing a state where the automatic water shut-off valve is opened in the case of compressible air fluid or at pressure lower than set pressure and a state where the automatic water shut-off valve is closed in the case of incompressible fluid or at pressure higher than set pressure.
Figure 2:
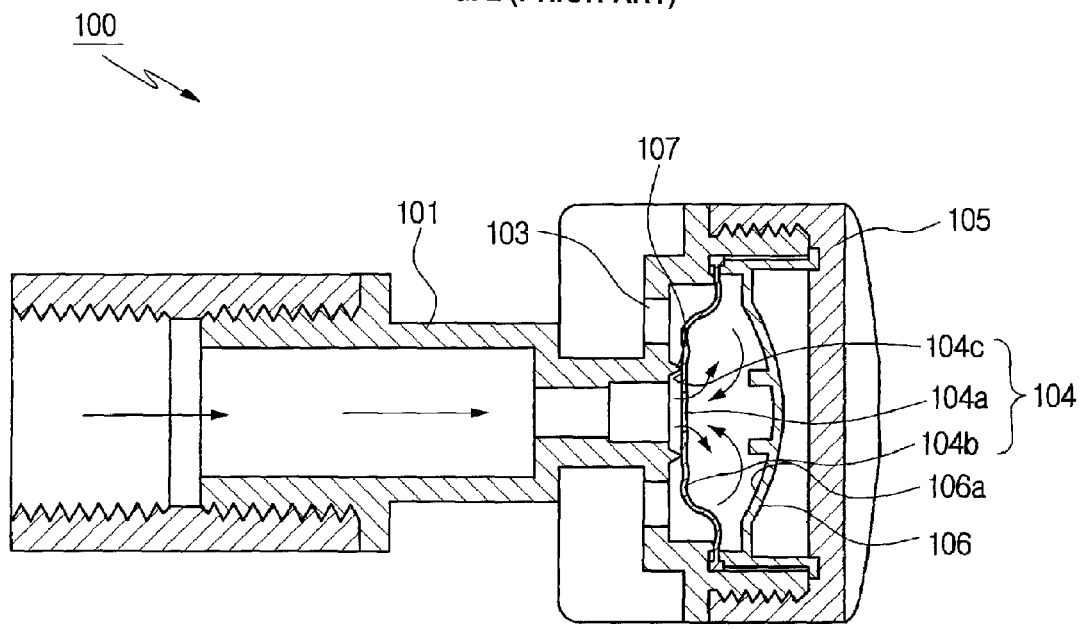
Figure 3:
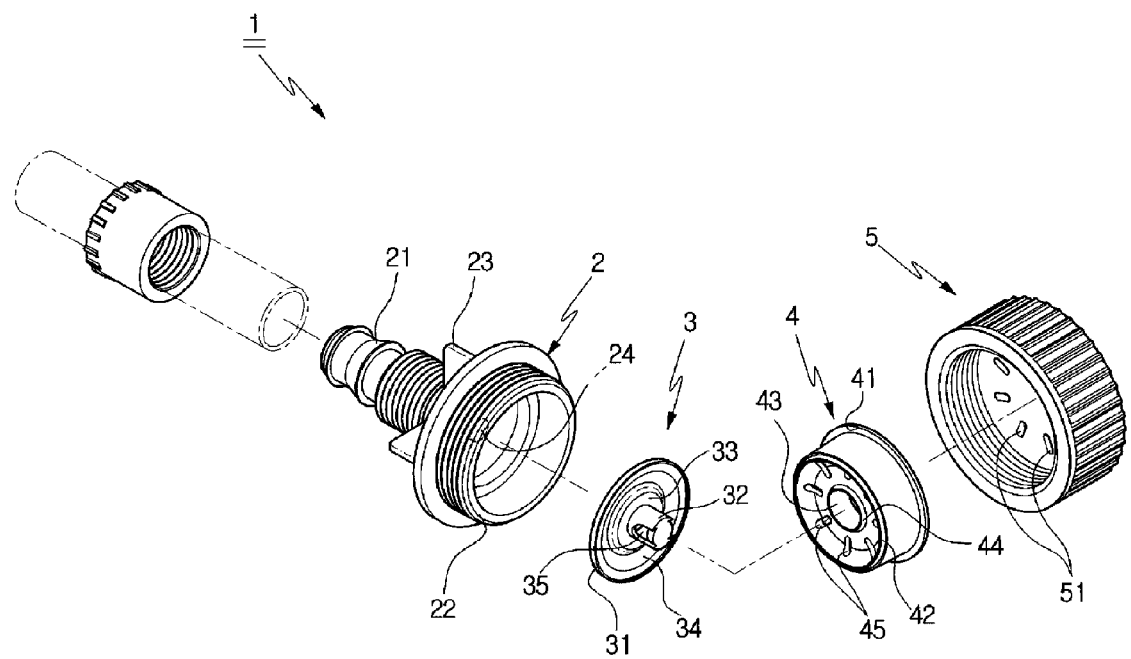
FIG. 3 is an exploded perspective view showing an automatic water shut-off valve according to a preferred embodiment of the present invention.
Figure 4:
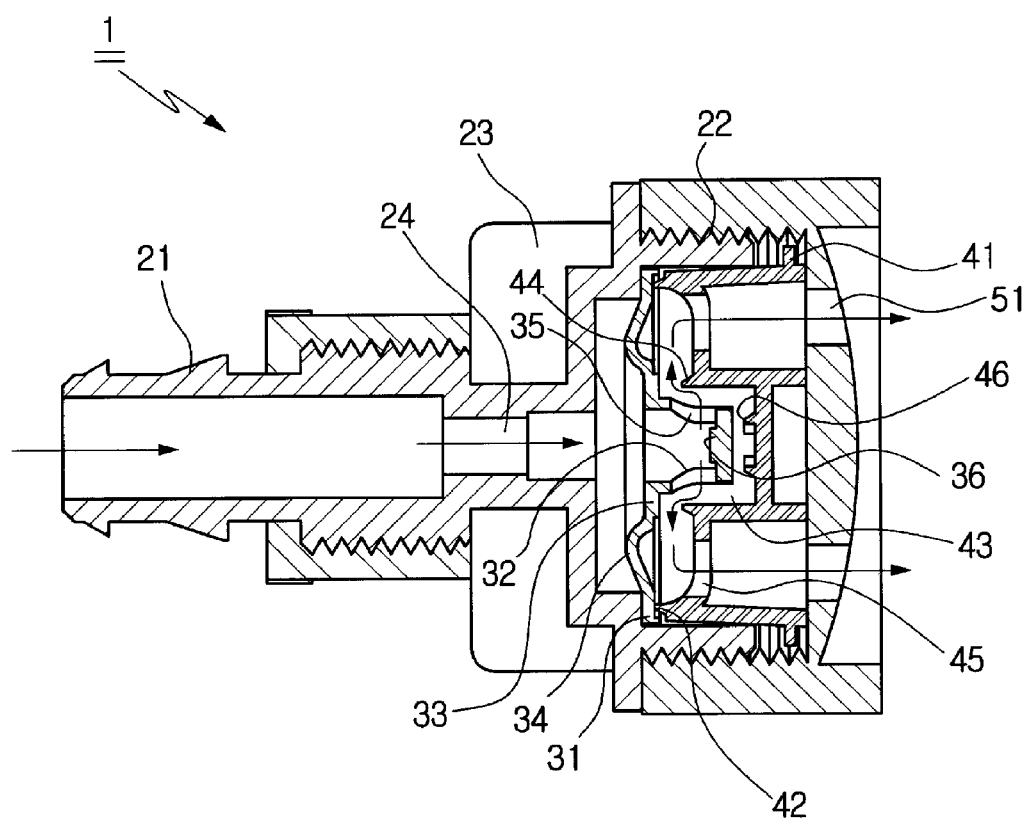
FIGS. 4 and 5 are sectional views of an automatic water shut-off valve of FIG. 3, showing a state where the automatic water shut-off valve is opened in the case of compressible air fluid or at pressure lower than set pressure and a state where the automatic water shut-off valve is closed in the case of incompressible fluid or at pressure higher than set pressure.
Figure 5:
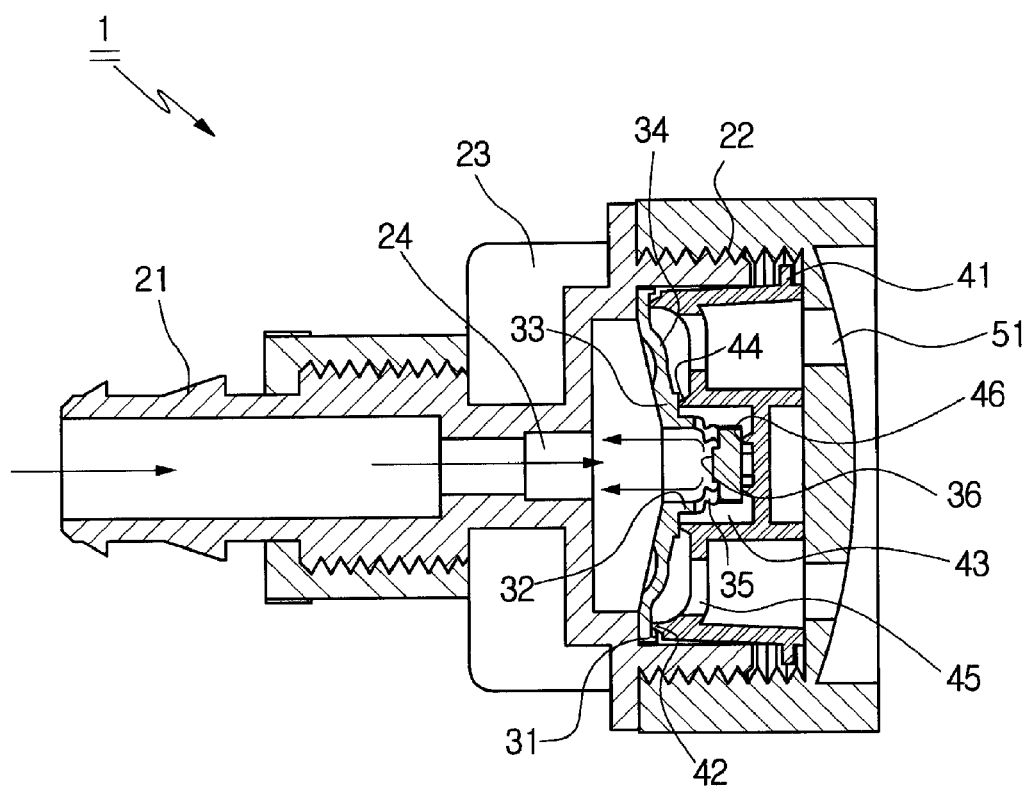

Reference will be now made in detail to the preferred embodiment of the present invention with reference to the attached drawings. FIG. 3 is an exploded perspective view showing an automatic water shut-off valve according to a preferred embodiment of the present invention, and FIGS. 4 and 5 are sectional views of the automatic water shut-off valve of FIG. 3, showing a state where the automatic water shut-off valve is opened in the case of compressible air fluid or at pressure lower than set pressure and a state where the automatic water shut-off valve is closed in the case of incompressible fluid or at pressure higher than set pressure.

As shown in the drawings, the automatic water shut-off valve 1 according to the present invention includes: a body 2 having a nipple 21 formed at a lower portion thereof, a rubber diaphragm 3 inserted into a protruding threaded pipe 22 formed at an outside portion of the body 2, and a pressure supporter 4 pressurized by a fixing cap 5 screw-coupled with the protruding threaded pipe 22 to pressurize the rubber diaphragm 3.

The body 2 has a rib-shaped hand-grip 23 formed on a side where the nipple 21 is formed, and the nipple 21 may be formed for a taper drip or an inline drip.

When viewed in cross section, the rubber diaphragm 3 includes: a fixing jaw 31 formed on the rim and abutting on the inner face of the protruding threaded pipe 22; a protrusion pipe 32 formed at the center and having a front end stopped in a fluid flow direction on the same axis so as to be communicated with the fluid supply hole 24 formed on the nipple 21; a fluid switching face 33 formed around the protrusion pipe 32; and an operation member 34 adapted for connecting the fixing jaw 31 and the fluid switching face 33 with each other.

The operation member 34 is thinner than the fluid switching face 33 and is formed in a bent condition to thereby provide flexibility, and the protrusion pipe 32 includes fluid flow holes 35 formed symmetrically laterally, and an impact absorbing protrusion 36 formed inside a stopped front end of the protrusion pipe 32.

The pressure supporter 4 which is inserted into the protruding threaded pipe 22 includes: a hand-grip rib 41 protrudingly formed on an outer face; a compressing protrusion 42 formed on the rim for pressurizing the inside of the fixing jaw 31 of the rubber diaphragm 3; and an insertion hole 43 formed at the center in such a fashion that the protrusion pipe 32 formed on the rubber diaphragm 3 is inserted into the insertion hole 43 in a spaced state. A fluid stop protrusion 44 which selectively abuts on the fluid switching face 33 of the rubber diaphragm 3 is formed at a front end of the insertion hole 43, and drain holes 45 are formed around the insertion hole 43. Furthermore, an impact absorbing support rib 46 is formed on the inner face of the insertion hole 43 in such a way as to abut on the front end of the protrusion pipe 32.

The impact absorbing support rib 46 has a cut portion (not shown in the drawings), and the cut portion serves to prevent that the impact absorbing support rib 46 and the protrusion pipe 32 of the rubber diaphragm 3 are joined together in a vacuum state when the front end of the protrusion pipe 32 gets in contact with the impact absorbing support rib 46.

The fixing cap 5 has a nut structure that is screw-coupled with the protruding threaded pipe 22, pressurizes the pressure supporter 4 toward the body 2, and includes a cap drain hole 51 communicating with the drain hole 45 formed in the pressure supporter 4.

The automatic water shut-off valve having the above-mentioned structure according to the present invention may be applied to drip tapes and inline drip irrigation systems used for green house cultivation or outdoor cultivation, and hereinafter, an operation of the automatic water shut-off valve according to the present invention will be described.

The automatic water shut-off valve according to the present invention has the structure that is automatically opened in the case of compressible air fluid or at pressure lower than set pressure and is automatically closed in the case of incompressible fluid or at pressure higher than set pressure.

First, in the case of compressible air fluid or at pressure lower than set pressure, as shown in FIG. 4, in a state where the fluid is supplied through the fluid supply hole 24 of the body 2, the fluid is supplied to the narrow fluid flow hole 35 formed in the protrusion pipe 32 of the rubber diaphragm 3.

In this instance, because the fluid switching face 33 of the rubber diaphragm 3 and the fluid stop protrusion 44 of the pressure supporter 4 are in a separated state, the fluid passes between the fluid switching face 33 of the rubber diaphragm 3 and the fluid stop protrusion 44 of the pressure supporter 4 and is drained out through the cap drain hole 51 of the fixing cap 5.

Additionally, in the case of incompressible fluid or at pressure higher than set pressure, as shown in FIG. 5, the fluid is supplied to the protrusion pipe 32 through the fluid supply hole 24 of the body 2, and in this instance, the fluid is not completely discharged to the narrow fluid flow hole 35, and hence, pressure is generated due to the stagnant fluid.

As described above, in the case that pressure is generated due to the stagnant fluid, lots of gases are contained initially, and in this instance, there occurs a severe vibration, and foreign matters of various kinds containing sands and others are discharged out while abutment and separation between the fluid switching face 33 and the fluid stop protrusion 44 are repeated like a pumping action.

After the above phenomenon, pressure of the fluid is increased, and in this instance, the front end of the protrusion pipe 32 gets deflated by the fluid pressure in a state where the front end of the protrusion pipe 32 is supported to the impact absorbing support rib 46 formed on the insertion hole 43 of the pressure supporter 4. In this instance, the fluid is stopped while the fluid switching face 33 of the rubber diaphragm 3 gets in contact with the fluid stop protrusion 44 of the pressure supporter 4.

While the detailed embodiment is described in the detailed description of the present invention, it is appreciated that various changes and modifications are possible within the scope of the invention without departing from the category of the present invention. Therefore, it should be understood that the protective scope of the present invention is not limited to the described embodiment but is defined by equivalents as well as the following claims.

INDUSTRIAL APPLICABILITY

As described above, the automatic water shut-off valve according to the present invention is easily assembled and disassembled and is easy to clean and replace with a new one because it is simple in structure, and can easily control the fluid according to hardness of the rubber diaphragm.

What is claimed is:

1. An automatic water shut-off valve comprising:
a body (2) having a fluid supply hole (24) formed in a longitudinal direction within the body (2), the body (2) having a generally tubular shape with a proximal portion for fixing to a water supply line and a distal portion including an enlarged pipe portion (22);
an elastic diaphragm (3) installed within the enlarged pipe portion (22), the elastic diaphragm formed of an elastic sheet material and having an outer fixing flange portion (31) of generally annular shape, an inner switching face portion (33), an operation portion (34) connecting between the outer fixing flange portion and the inner switching face portion, and a central protrusion pipe portion (32); and
a pressure supporter (4) installed within the enlarged pipe portion (22) and configured to press the outer fixing flange portion (31) of the diaphragm (3) with a fixing cap (5) coupled to enlarged pipe portion (22),
wherein the central protrusion pipe portion (32) of the diaphragm has a closed front face, and a side wall portion with one or more fluid flow holes (35) formed laterally in the side wall portion thereof,
wherein the pressure supporter (4) has a plurality of drain holes (45) and the fixing cap (5) has a plurality of second drain holes (51), so that a fluid is drained through the fluid flow holes (35) formed at the side wall portion of the diaphragm (3) when a compressible air flows or when a fluid flows at pressure lower than a set pressure and is automatically shut off when the inner switching face portion (33) of the diaphragm (3) abuts against a fluid stop protrusion (44) of the pressure supporter (4) when a fluid flows at pressure higher than the set pressure.

2. The automatic water shut-off valve according to claim 1, wherein the pressure supporter (4) comprises: a compressing protrusion (42) for pressing the outer fixing flange portion (31) of the diaphragm (3); and an inner concave space (43) formed at a center in such a fashion that the protrusion pipe portion (32) of the diaphragm (3) is received within the inner concave space (43).

3. The automatic water shut-off valve according to claim 2, wherein the operation portion (34) is thinner than the inner switching face portion (33) and is in a bent or curved configuration to thereby provide flexibility.

4. The automatic water shut-off valve according to claim 2, wherein the protrusion pipe portion (32) has an impact absorbing protrusion (36) formed at a rear surface of the closed front face thereof and an impact absorbing support rib (46) is formed on an inner face of the inner concave space (43) in such a way as to abut on the front face of the protrusion pipe portion (32) to thereby support the protrusion pipe portion (32) in the case when the fluid flows at pressure higher than the set pressure.

5. The automatic water shut-off valve according to claim 1, wherein the body (2) includes a nipple (21) formed in the proximal portion of the body.

* * * * *